Fig. 1

INVENTOR
EDWARD J. NOVAK by
Mason, Kolehmainen, Rathburn and Wyss
ATTORNEYS.

INVENTOR
EDWARD J. NOVAK

United States Patent Office 3,405,602
Patented Oct. 15, 1968

3,405,602
FLUID MOTOR HAVING A SUPPLY-AND-EX-
HAUST VALVE CARRIED BY THE PISTON
Edward J. Novak, Franklin Park, Ill., assignor to Fastener Corporation, Franklin Park, Ill., a corporation of Illinois
Filed Dec. 17, 1965, Ser. No. 514,502
22 Claims. (Cl. 91—28)

ABSTRACT OF THE DISCLOSURE

A single stroke pneumatic motor for a fastener driving tool comprising a housing defining a reservoir for pressurized fluid, a cylinder in the housing, and piston means slidably mounted in the cylinder including a piston valve means and a valve seat thereon. The piston valve means are movable bodily with the piston means and are movable against the seat for normally closing the communication between the reservoir and one end of the cylinder. Means are provided for moving the piston valve means away from the seat to place the reservoir in communication with the cylinder, thereby admitting pressurized fluid for driving the piston means.

---

The present invention relates to fluid motors and, more particularly, relates to fluid-actuated motors for use in apparatus for driving fasteners into a workpiece.

In many fluid-operated tools, such as pneumatically operated nailers, tackers, staplers, and the like, a fluid-operated piston moves a fastener driving blade, or the like, through a single power stroke to drive a fastener into a workpiece. In many of these tools, the piston is also moved by fluid pressure on a return stroke in the opposite direction to a home or normal position in which it is maintained until the next power stroke is initiated. The power strokes in many of the prior tools are initiated by the abrupt admission of a large quantity of compressed air into one end of a cylinder from a supply housing under the control of manually or automatically actuated valve mechanisms. In most tools of this type, the valve mechanisms are quite complex and are usually located on the tool housing adjacent the upper end of the cylinder. This adds substantially to the size and weight of the tool and makes it more cumbersome and awkward to manipulate, especially when only limited space is available, as is commonly the case in assembly line operations. Moreover, complex valve mechanisms are subject to conisderable maintenance and wear and are quite expensive to manufacture.

Accordingly, it is an object of the present invention to provide a new and improved fluid actuated motor.

Another object of the present invention is the provision of a new and improved fastener driving tool employing a fluid motor drive therein which eliminates or greatly reduces the aforementioned difficulties in present tools.

Yet another object of the present invention is the provision of a new and improved fastener driving tool employing a much simpler and less expensive valve mechanism for initiating a power stroke of the tool.

More specifically, it is an object of the present invention to provide a new and improved tool having a fluid actuated motor therein which utilizes compressed air already in the cylinder for aiding in the actuating of the piston on a power stroke.

Yet another object of the present invention is the provision of a new and improved tool including a fluid motor in which the power stroke is initiated using only a small metered quantity of compressed fluid.

Still another object of the present invention is the provision of a new and improved tool employing a fluid motor having piston means with a portion of the actuating valve mechanism of the tool carried directly thereon.

A further object of the present invention is the provision of a new and improved tool having a fluid motor employing means for momentarily delaying movement of the piston on a power stroke until a large quantity of compressed air is acting directly on the piston.

A still further object of the present invention is the provision of a new and improved tool having a fluid motor with means therein for preventing inadvertent initiation of a power stroke.

A yet further object of the present invention is the provision of a new and improved tool having a fluid motor with means therein for preventing the initiation of a power stroke upon connecting or disconnecting the tool to a source of compressed fluid, such as an air line.

A still further object of the present invention is the provision of a new and improved tool having a fluid motor with means for automatically initiating power strokes at selected intervals.

Another object of the present invention is the provision of a new and improved tool which is more easily manufactured and assembled, lower in cost, and easy to maintain in operation.

In accordance with these and many other objects, an embodiment of the present invention comprises a new and improved portable fastener driving tool including a sealed housing supplied with compressed fluid. A cylinder means mounted in the housing slidably receives piston means connected to the upper end of a fastener driving blade. The piston means includes a piston chamber which is sealed between opposite ends of the piston, and port means is provided in the cylinder wall to place the piston chamber in communication with the compressed fluid within the housing. Pressure responsive valve means mounted on the piston are operable to open and close communication between the piston chamber and a power end of the cylinder opposite the fastener driving blade. A manually operated valve means on the housing, when operated, supplies a small metered quantity of compressed fluid to the upper end of the cylinder.

The piston valve means forms an integral part of the piston means and, after an initial small amount of travel of the valve on the piston means from the closed to open position, the entire piston assembly then moves rapidly downward on a power stroke under the influence of the metered quantity of fluid plus fluid already in the piston chamber and additional fluid entering the cylinder through the port means in the cylinder wall.

The manually operated valve means is associated with a metering valve chamber in the housing and, when opened, permits the fluid within the valve chamber to flow into the power end of the cylinder but prevents fluid from the housing from refilling the valve chamber. When the valve means is closed, the valve chamber is sealed from the power end of the cylinder, and the valve chamber is refilled with pressurized fluid from the housing in preparation for the next power stroke.

The end of the piston adjacent the power end of the cylinder is slightly larger in diameter than the opposite end, and a small bleed passage extends between the opposite ends of the piston. After a power stroke, the fluid in the power end of the cylinder bleeds out through the passage in the piston and this permits the pressure responsive valve means on the piston to close and seal off communication between the piston chamber and the power end of the cylinder. When this occurs, a small amount of pressurized fluid enters the piston chamber and acts upon the large diameter portion of the piston, causing the piston to move toward the power end of the cylinder on a return stroke in preparation for the next power stroke. In this manner, the piston and driver blade are returned automatically and independently of the length of time that the manual valve is held in an operated stroke. During the return stroke, any pressurized fluid remaining in the power end of the cylinder passes through the bleed passage in the piston therein to the atmosphere.

In another embodiment of the invention, the manually operated valve means and metering chamber for initiating the power stroke is replaced with an adjustable metering valve. Fluid from the metering valve continuously passes into the power end of the cylinder, and when the pressure reaches a high enough valve to open the piston valve means a power stroke is initiated. By adjusting the metering valve, the interval between successive power strokes can be selectively adjusted and the tool will operate on a selected time cycle without requiring manual depression of a trigger or other control means.

Many other objects and advantages of the present invention will become apparent from the following detailed description when considered in conjunction with the drawings, in which.

Referring now, more specifically, to the drawings, therein is illustrated a portable fastener driving tool which embodies the present invention and which is indicated generally as 10. The tool 10 comprises a sealed housing or casing 12 formed with a rearwardly extending hollow handle 14 and a forward end or head section 16 extending generally normal thereto. The interior of the housing 12 forms a reservoir for compressed fluid and is continuously supplied with compressed air from an air line (not shown) which is detachably connected to a suitable fitting (not shown), preferably located on the rearward portion of the hollow handle 14 of the tool. The forward end or head section 16 comprises an enlarged, upper chamber 18 in direct communication with the handle portion 14 and a reduced diameter, cylindrical lower chamber defining structure 20 which depends downwardly from the handle.

The enlarged upper chamber 18 is sealed from the atmosphere with a removable upper end cap 22 and gasket 24, and the lower end of the lower chamber 20 is closed by a removable end plug 26 having a large central aperture 26a which vents the lower end of the lower chamber structure 20 to the atmosphere. A nosepiece assembly 28 is secured to the underside of the end plug 26 and includes a vertically extending guideway or drive track 30 for guiding fasteners 32 supplied from the forward end of a magazine assembly 34. The fasteners 32 are supplied to the drive track 30 one at a time by the magazine assembly 34 and are driven downwardly into a workpiece below the nosepiece assembly 28 by a reciprocating driver or drive blade 36 which extends upwardly from the drive track through the aperture 26a into the chamber 20.

In order to reciprocate the driver 36 and drive the fasteners 32, a movable piston assembly 38 is slidably mounted in an upwardly extending cylinder means 40 disposed in the forward end or head section 16 of the housing 12. The cylinder means 40 comprises an upper, large diameter wall section 42 and a lower, smaller diameter portion 44 defined by the inner wall surface of the depending lower chamber 20. The cylinder section 42 can be withdrawn from the housing 12 and replaced with another by removing the upper cap 22 and pulling the section upwardly and out of the housing 12. The cylinder section 42 is formed with an outwardly extending annular seating flange 42a at the upper end thereof and a similar flange 42b at the lower end for seating and centering the section in coaxial alignment with the lower cylinder portion 44. A pair of O-ring seals 46 and 48 are carried on the respective flanges to seal the ends of the section against the housing walls, and an O-ring 49 is carried in the internal bore of the cylinder section 42 at the lower end thereof to seal against the upper head portion of the piston assembly 38 when the piston assembly is in a lower position at the end of a power stroke, as shown in FIG. 3.

Figure 1:
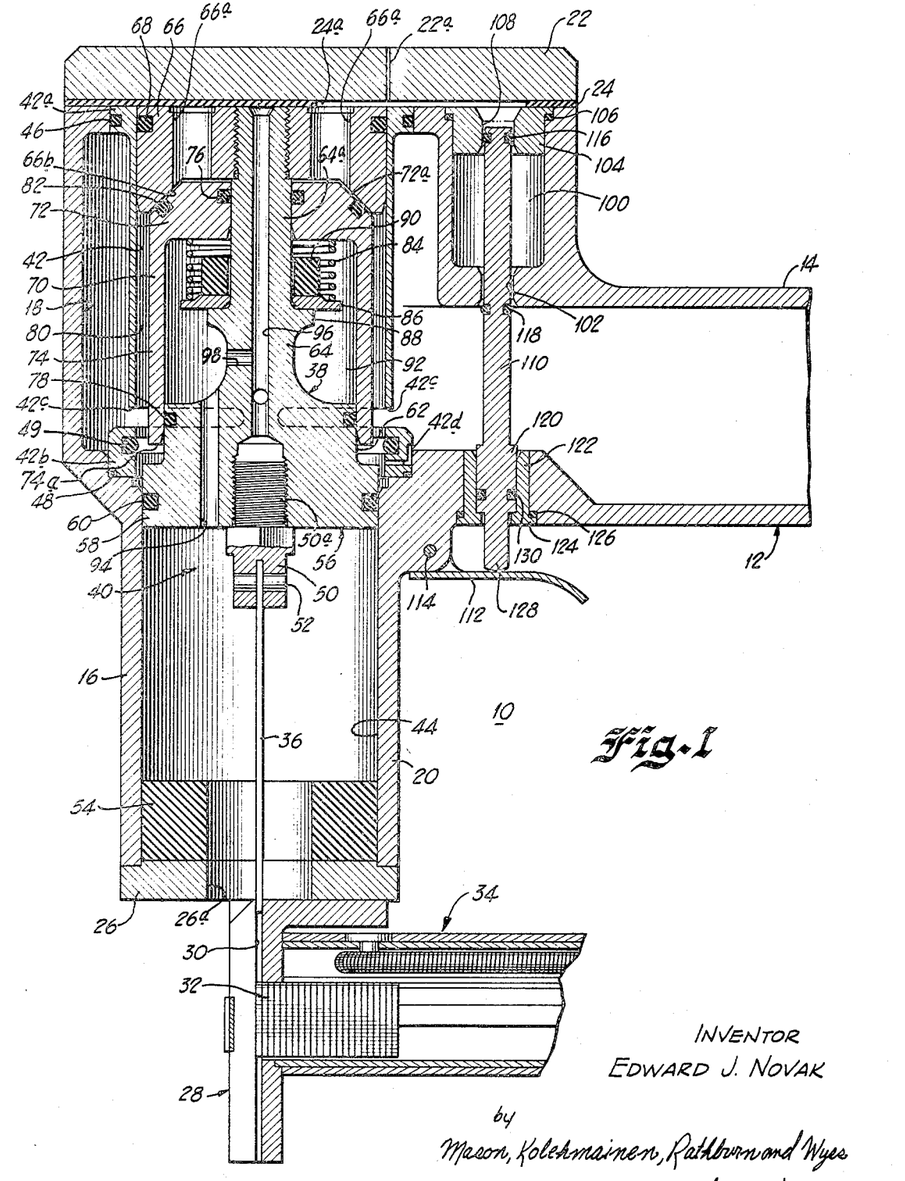
FIG. 1 is a fragmentary sectional view of a pneumatically operated fastener driving tool which embodies the present invention and which illustrates the tool in a normal position.
Figure 2:
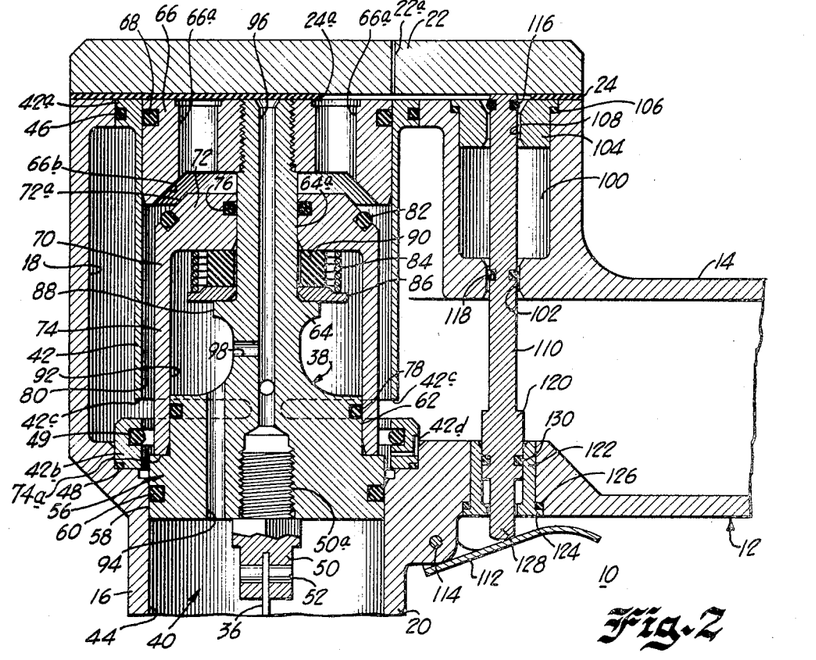
FIG. 2 is a fragmentary sectional view of the tool of FIG. 1 illustrating the tool in a position after the actuation of the tool to initiate a power stroke.

The driver blade 36 is connected to the lower end of the piston assembly 38 with a connecting member 50 having an upwardly extending threaded stem 50a which is threaded into an upwardly extending, centrally disposed, threaded bore provided in the lower portion of the piston assembly. The connecting member 50 extends downwardly below the lower end surface of the piston assembly 38 and is formed with a slot for receiving the upper end of the driving blade 36 which is secured thereto by a transverse shear pin 52. When the piston assembly 38 is in an upper or normal position at the upper or power end of the cylinder 40 in readiness for a downward or driving power stroke, the upper end of the piston rests against the underside of the gasket 24, as shown in FIGS. 1 and 2. At the end of a power stroke, the piston assembly 38 is in a lower position, as indicated in FIG. 3, wherein the lower surface of the piston is in engagement with the upper surface of an annular cushion member or bumper 54 mounted in the lower end of the cylinder section 44. The bumper 54 is constructed of resilient material, such as rubber, and is provided with a central bore in alignment with the aperture 26a of the end plug to accommodate the depending connecting member 50 and the driver blade 36.

The piston assembly 38 comprises a main body 56 having an annular flange 58 formed at the lower end for sliding movement within the lower section 44 of the cylinder means 40. An O-ring seal 60 carried on the flange 58 effects an airtight seal between the lower end of the piston assembly and the lower cylinder wall. Immediately above the lower flange 58, the body 56 is formed with an inwardly extending, recessed shoulder 62 connected to the lower end of a relatively small diameter stem portion 64, the upper end of which is threadedly secured to an upper piston head 66. The upper piston head is slidable within the large diameter upper cylinder section 42, and an O-ring seal 68 carried on the piston member effects an airtight seal between the upper end of the piston assembly and the cylinder.

Figures 3, 5:
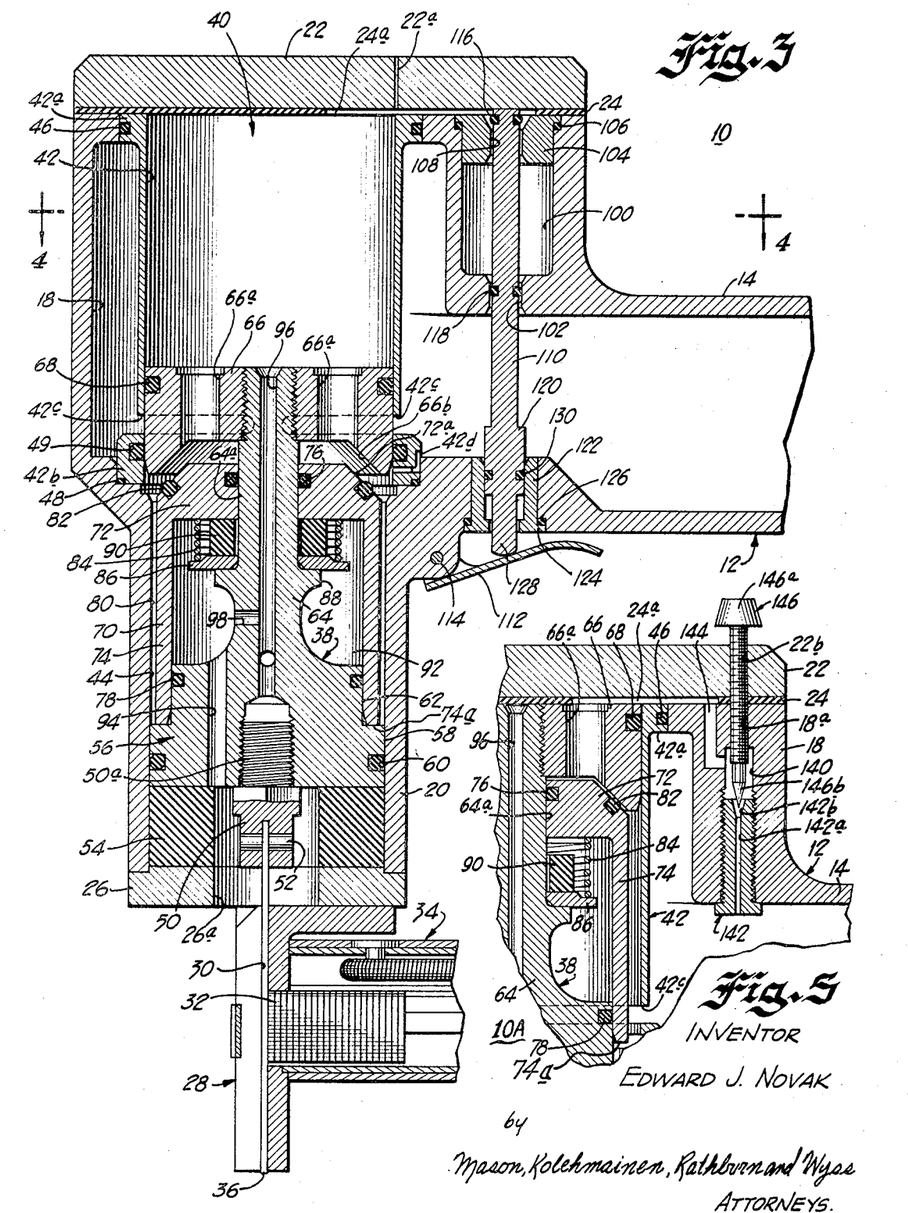
FIG. 3 is a fragmentary sectional view similar to FIG. 2 but illustrating the tool or motor at the completion of a power stroke.
FIG. 5 is a fragmentary sectional view of another embodiment of a pneumatically actuated fastener driving tool constructed in accordance with the present invention and employing automatic means for initiating successive power strokes at selected time intervals.
Figure 4:
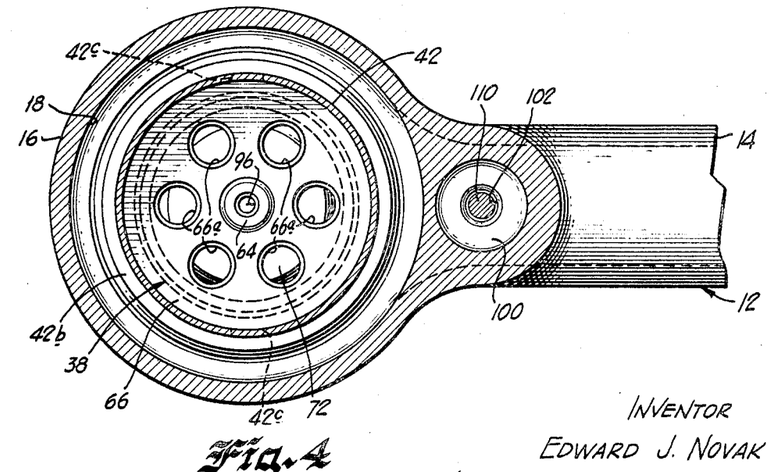
FIG. 4 is a fragmentary sectional view taken substantially along the lines 4—4 of FIG. 3.

A pressure responsive piston valve member 70 is mounted on the piston assembly 38 intermediate the ends thereof and is movable thereon between an upper sealing or closed position (FIG. 1) and a lower or open position (FIGS. 2 and 3). The piston valve member 70 is cup-shaped and includes a radially extending upper end wall or head 72 having a central aperture therein through which a smooth cylindrical portion 64a of the stem 64 extends to guide sliding movement of the valve member relative to the body of the piston assembly. The piston valve member also includes a downwardly depending cylindrical skirt or sidewall 74 integrally formed with the head 72, and the lower end of the skirt is guided and centered for sliding movement on the piston assembly by an upwardly extending cylindrical sidewall of the recessed shoulder 62. When the piston valve member 70 is in its lower position (FIGS. 2 and 3) the lower end of the skirt 74 rests upon the radial face of the shoulder recess 62 and, accordingly, further relative movement in a downward direction between the piston valve member and the main body 56 of the piston assembly is terminated. An airtight seal is effected between the portion 64a of the stem 64 and the head 72 of the piston valve assembly with an upper O-ring seal 76 and the inner surface of the skirt 74 and the cylindrical wall of the shoulder 62 are sealed by a lower O-ring 78.

The outer diameter of the piston valve skirt 74 is smaller than the internal diameter of both the upper cylinder section 42 and the lower cylinder portion 44, and this skirt forms the inner wall of a piston chamber or cavity 80 that also is defined by the lower piston flange 58, the upper piston head 66, and the inner walls of the cylinder means 40. The piston chamber 80 moves with the piston assembly 38 in the cylinder means 40 and is somewhat larger in volume when the piston assembly is in the upper position (FIGS. 1 and 2) than it is when the piston assembly is in the lower position (FIG. 3) because of the difference in diameter between the upper section 42 and lower side portion 44 of the cylinder means 40. The piston chamber is sealed from the opposite ends of the cylinder means 40 when the piston valve member 70 is in an upper, closed position (FIG. 1) and is continuously supplied with compressed air from the housing 12 regardless of the position of the piston assembly 38 within the cylinder 40 through a pair of relatively large ports or slots 42c formed adjacent the lower end portion of the cylinder section 42.

The piston head member 66 is formed with a plurality of passages 66a extending downwardly between the upper and lower surfaces thereof to permit fluid flow between the piston chamber 80 and the upper end of the cylinder 40 when the piston valve member 70 is in the open position shown in FIGS. 2 and 3. The lower surface of the piston head 66 is concave and includes an outer, frustoconical seating surface 66b against which a similarly shaped, outer, frustoconical surface 72a, formed on the upper surface of the head 72 of the piston valve member 70, seats when the valve member is in a closed position (FIG. 1). An O-ring seal 82 mounted in a recess formed on the seating surface 72a of the piston valve member tightly seals the upper end of the piston chamber 80 from communication with the upper end of the cylinder 40 when the piston valve member is seated.

The piston valve member 70 is biased to the closed position (FIG. 1) by a coil spring 84 axially centered around the stem 64 of the body 56 of the piston assembly and by pressurized air acting against the lower end 74a of the valve member skirt 74. In this connection, it should be noted that the surface area of the lower end 74a is somewhat greater than the effective area of the seating surface 72a on the opposite end of the valve member 70 outwardly of the O-ring 82, and, accordingly, the compressed air in the piston chamber 80 exerts a resultant force upwardly on the piston valve member. Consequently, the spring 84 does not have to be very strong because most of the upward force to close the valve member 70 is supplied by the air pressure in the piston chamber, as described. The upper end of the spring bears against the underside of the piston valve head 72 to urge the piston valve member 70 upwardly with respect to the stem. The lower end of the spring 84 bears against a thrust washer 86 which is carried on the stem 64 and which is seated against the upper surface of an annular flange 88 formed thereon. In order to cushion shocks applied to the valve stem 64 when the piston valve member 70 is opened, an annular bumper 90 of the resilient material is mounted on the stem within the coil spring 84 between the thrust washer 86 and the underside of the piston valve head 70.

Because the stem 64 is of relatively small diameter compared to the internal diameter of the piston valve skirt 74, a hollow cavity or piston valve chamber 92 is formed in the piston assembly 38 intermediate its ends between the interior surfaces of the piston valve member 70 and the outer surfaces of the stem 64. The volume of the chamber 92 is changed as the piston valve member 70 moves up and down on the stem between open and closed positions. The O-rings 76 and 78 seal the upper and lower ends of the chamber 92 from communication with the outer piston chamber 80 regardless of the position of the piston valve member on the stem. The chamber 92 is maintained at atmospheric pressure by means of a drilled passage 94 which extends downwardly from this chamber through the lower end of the main body 56 to communicate with the lower portion 44 of the cylinder which is vented to the atmosphere through the large central aperture 26a in the end plug 26.

Whenever the force acting on the upper surface of the piston valve head 72 is sufficient to overcome both the upward force of the biasing spring 84, the fluid pressure acting on the underside of the piston valve head 72 and the differential force acting against the lower end 74a of the skirt, the piston valve member 70 will move from the closed position (FIG. 1) to the open position (FIGS. 2 and 3). When the downward force acting on the upper surface of the piston valve head is less than these forces, the piston valve member 70 is moved upwardly on the stem to the closed position. The piston valve member 70 is thus responsive to the differential pressure existing across the head 72 of this valve member.

When a small amount of compressed fluid is introduced into the power end of the cylinder means 40 above the piston head 66, the fluid flows downwardly through the passages 66a and acts upon the upper surface of the valve head 72 against the force of the spring 84 and causes the piston valve member 70 to move downwardly relative to the main body 56 of the piston assembly which still remains momentarily stationary. As the seating surface 72a and O-ring 82 on the valve member move downwardly away from the seating surface 66b on the piston head and compressed fluid within the piston chamber 80 flows upwardly into the power end of the cylinder, the fluid flowing into the upper end of the cylinder from the piston chamber 80 is rapidly replaced by fluid flowing into the chamber through the large ports 42c in communication with the chamber 18 and handle 14. By the time the lower end of the piston valve skirt 74 strikes the radial surface of the shoulder 62 on the body 56 of the piston assembly, a large supply of compressed fluid is available in the region above the piston valve head 72 and piston head 66, and this fluid drives the entire piston assembly 38 downwardly on a rapid stroke. The initial downward movement of the piston valve member 70 alone provides a built-in time delay so that a large quantity of compressed fluid is available to drive the entire piston assembly 38 downward. Moreover, the downward momentum of the piston valve member 70, as it strikes the radial surface of the shoulder 62 on the main body 56, materially aids in rapidly accelerating the piston assembly on a downward driving stroke.

In order to supply compressed fluid to the upper end of the cylinder section 42 to unseat the piston valve member 70 and initiate a power stroke, a separate metering valve chamber 100 is formed in an enlarged upper portion of the head section 16 adjacent the rear side of the upper cylinder section 42 and above the hollow handle 14. The metering chamber is in communication with the upper end of the cylinder section 42 through a passage 24a and includes an inlet opening 102 in communication with the interior of the handle 14 for supplying compressed fluid to the chamber. The upper end of the metering chamber is closed with a shouldered bushing 104 and O-ring seal 106 and the bushing includes a central aperture 108 therein forming an outlet for the chamber. The outlet 108 of the metering chamber 100 is in direct communication with the upper end of the cylinder section 42 and the passages 66a in the piston head 66. This communication is provided by the cut-out portion or passage 24a in the gasket 24 which forms a space or passage for fluid flow between the underside of the cap 22 and an upper surface of the housing.

The openings 102 and 108 of the chamber 100 are in coaxial alignment in order to slidably receive the upper portion of a rodlike valve member 110 which extends downwardly through and below the hollow handle 14 for actuation by a manually operated trigger 112 pivotally mounted on the underside of the handle with a pin 114. The valve member includes an upper O-ring seal 116 positioned on the valve member to seal the outlet 108 and a spaced lower O-ring seal 118 to seal the inlet 102 of the chamber. The lower portion of the valve member includes an enlarged cylindrical segment 120 disposed for sliding movement in the central bore of a bushing 122 mounted in an opening in the lower wall of the handle 14 of the housing. The bushing includes a lower end flange 124 seated against an O-ring 126 which seals the bushing within a shouldered opening in the handle wall. The valve member 110 also includes an operator stem 128 extending downwardly from the segment 120 through a central opening in the bushing end flange 124 for engagement with the trigger 112, and an airtight seal is maintained between the bushing and the valve member by an O-ring 130 carried on the enlarged segment 120.

When the valve member 110 is in a normal position (FIG. 1), the outlet 108 of the valve chamber 100 is closed by the O-ring 116 and the inlet 102 is open to admit compressed fluid from the housing into the valve chamber. The valve member is maintained in the normal position by the compressed fluid in the handle 14 acting against the radial shoulder formed at the upper end of the enlarged segment 120 on the valve member. In order to initiate a power stroke, the trigger 112 is manually depressed (FIGS. 2 and 3), moving the valve member 110 upwardly from its normal position. When this occurs, the O-ring 116 moves upwardly to open the outlet 108 of the chamber and permit the metered quantity of fluid in the chamber to flow into the upper end of the cylinder section 42 through the ports 66a and initiate a power stroke. The O-rings 116 and 118 are spaced relative to each other on the valve member 110 so that, on upward movement of the valve member, the inlet 102 of the valve chamber closes before the outlet 108 is opened. Conversely, as the valve member 110 moves downwardly from its upper position, the outlet 108 is closed before the inlet 102 is again opened and, accordingly, there is no possibility that the valve member could move to an intermediate position or flutter back and forth so as to permit pressurized air from the handle to flow continuously into the upper end of the cylinder and repeatedly fire the tool. Only the metered quantity of compressed fluid in the valve chamber 100 at the instant of trigger depression is supplied to initiate the power stroke because the lower O-ring 118 moves upwardly to close the inlet 102 of the valve chamber when the trigger is depressed. The triggering fluid supplied by the valve chamber 100 is useful in supplying power for the driving stroke; however, the major portion of the compressed fluid for the drive stroke is supplied directly from the handle 14 through the large ports 42c in the cylinder section.

If the trigger 112 is held in a depressed condition after the completion of a power stroke, the automatic return stroke of the piston assembly 38 will continue normally because, even though the outlet 108 of the valve chamber 100 is still open, the inlet 102 is closed, cutting off the supply of compressed fluid to the valve chamber. Once the trigger is released, the valve member 110 will move to the normal position (FIG. 1) under the influence of fluid pressure on the enlarged section 120, closing the outlet 108 of the valve chamber and opening the inlet 102 to admit a new supply of compressed fluid into the valve chamber. The valve chamber 100 limits the amount of compressed fluid utilized to initiate each driving stroke regardless of how long the trigger is depressed, and thus provides a highly efficient tool which can be operated with a far lower volume flow of fluid than presently available tools. Accordingly, a greater number of tools 10 of the present invention can be connected to a source of compressed fluid of given capacity than is possible with previous types of tools. The metering valve chamber 100 and associated valve member 110 provide a unique safety feature for the tool 10 in that if the tool is connected to an air line or other source of compressed fluid with the trigger in a depressed condition, the tool will not fire because airflow into the upper end of the cylinder is shut off by the O-ring 118 seated in the inlet port 102 of the metering valve chamber. The pressurized fluid will, however, automatically actuate the piston on a return stroke, and when the trigger is released and again depressed the tool will fire. This is a highly desirable safety feature where large numbers of tools are used on an assembly line which may be shut down from time to time. When repressurizing the air supply conduit for the shut-down line, there is no danger that any of the tools will fire even if the triggers may happen to be in a depressed condition because of inadvertent movement of the tool against another object during the shut-down period.

As another added safety feature, the cap 22 of the tool is provided with a small vent passage 22a which is in communication between the passage 24a and the atmosphere. Should either of the O-rings 116 or 118 on the valve member 110 become faulty and permit pressurized fluid to leak past their respective seats, the tool will not be fired because the passage 22a will vent the leaking fluid to atmosphere before enough pressure can build up in the passage 24a and ports 66a to unseat the piston valve member. In addition to the safety function just described, the passage 22a also serves as a means for venting the upper end of the cylinder section 42 on a return stroke of the piston assembly 38. The passage 22a is of small bore and does not materially affect the pressure of the triggering air supplied from the metering valve chamber 100.

In the tool 10, some of the pressurized fluid used during a power stroke is supplied from the fluid already present within the cylinder section 42 in the piston chamber 80, and the metering valve chamber 100 only supplies a small metered quantity of fluid to initiate and drive the power stroke. Accordingly, the initiation of a power stroke is very rapid, and turbulence losses during flow into the cylinder are greatly reduced. Because the power stroke is controlled by the seating and unseating of the piston valve member 70 mounted on the piston assembly 38 itself, the length of the forward end portion 16 of the housing which encloses the cylinder means 40 does not have to be increased to accommodate other complex valve mechanisms positioned externally of the cylinder for controlling fluid flow into the cylinder. The manually operated valve member 110 and associated valve chamber 100 are simple in construction and operation and can be positioned at one side rather than at the end of the power end of the cylinder because only a small metered amount of fluid is needed to unseat the piston valve member 70 and thereby initiate a power stroke. Moreover, the valve chamber and manual valve member do not interfere with the automatic return stroke of the piston assembly even though an operator may inadvertently maintain the trigger 112 in a depressed condition after a power stroke has been completed.

In order to exhaust the air in the upper or power end of the cylinder section 42 after a power stroke has been completed (FIG. 3), the stem 64 of the piston assembly is provided with a centrally disposed bleed passage 96 which extends downwardly from the upper end of the stem to communicate with the internal chamber 92 through a short transverse passage 98. During a downward power stroke of the piston assembly 38, a small amount of compressed air may pass through the passages 96 and 98 from the upper end of the cylinder section 42. However, the loss in power because of this passage is negligible since the power stroke is extremely rapid and the passage 96 is relatively small in diameter. At the end of the power stroke, the fluid pressure above the piston assembly 38 is reduced because of the closure at the ports 42c and the exhausting of air through the passages 96 and 98 in the piston body 56 so that the spring 84 can move the piston valve member 70 upwardly to a closed position (FIG. 1). When this occurs, communication between the piston chamber 80 and the upper end of the cylinder is cut off, and the pressure within the piston chamber acting on the underside of the large diameter piston head 66 causes the piston assembly to move upwardly on a return stroke toward the upper end of the cylinder.

The piston chamber 80 is continuously supplied with compressed air from the housing 12 during a power stroke until the end of the stroke (FIG. 3) when the ports 42c are blocked by the sidewall of the piston head 66. The piston head serves as a valve at this time, permitting the upper end of the cylinder section 42 to go to atmospheric pressure. When this occurs, the pressure above the upper surface of the piston valve head 72 is atmospheric and the spring 84 initiates an upward movement of the valve member 70 to the closed position. A small amount of compressed fluid is continuously supplied to piston chamber 80 through the small bleed passage 42d and, after the piston valve member 70 closes, the compressed air bleeding into the piston chamber 80 through the passage 42d causes the piston assembly 38 to move upwardly on a return stroke because of the differential area between the upper piston head 66 and the lower piston flange 58. Instead of a separate bleed passage 42d, the O-ring can be loosely fitted to permit a slight amount of air leakage into the piston chamber because only a small amount of pressurized fluid is needed to initiate a return stroke. During the first portion of the return stroke, the piston head 66 moves upwardly to uncover the large ports 42c and permit compressed fluid to enter the piston chamber in a large quantity. As the piston assembly 38 is returned to the normal position, the fluid above the upper piston head 66 is exhausted into the atmosphere, permitting full upward movement of the assembly until the upper end of the bleed passage 96 is closed against the gasket 24 (FIGS. 1 and 2). The piston assembly 38 is maintained in the upper or normal position at the top of the cylinder means 40 by the fluid pressure in the piston chamber 80 acting against the underside of the piston head 66 which is slightly larger in diameter than the lower piston flange 58.

When a power stroke is initiated, pressurized fluid from the metering valve chamber 100 is admitted to the upper end of the cylinder means 40 above the piston head 66 and flows downwardly through the passages 66a therein. The fluid entering the passages 66a acts upon the upper surface of the piston valve head 72 causing the piston valve member 70 to open or unseat from the seating surface 66b of the piston head 66. When this occurs, the compressed fluid already in the piston chamber 80 plus additional compressed fluid from the upper chamber 18 flowing through the ports 42c abruptly fill the upper end of the cylinder section 42, causing the piston assembly 38 to be driven rapidly downward on a power or driving stroke. This pressurized fluid acting on the upper surface of the piston valve head 72 maintains the piston valve member in an open position until the end of the driving stroke and, accordingly, compressed fluid is continuously supplied to the upper end of the cylinder during the power stroke from the piston chamber 80 which, in turn, is continuously supplied with compressed fluid from the housing 12 through the wall ports 42c. When the piston assembly approaches the end of the power stroke, the piston head 66 blocks off the ports 42c, as previously described, and only a small amount of fluid is supplied through the port 42d or leaky O-ring 48. Momentarily, after the end of a power stroke, the pressure above the piston assembly 38 is reduced by venting through the passages 96 and 98, piston valve chamber 92, and the passage 94; and the spring 84 then moves the piston valve member 70 upwardly to a closed position. Closing of the piston valve member after a power stroke initiates a return stroke of the piston assembly as the pressurized fluid in the piston chamber 80 acts on the underside of the piston head 66 to raise the piston assembly.

Referring now to FIG. 5, there is illustrated another embodiment of the present invention adapted for use in automated systems wherein fasteners are to be driven successively at selected time intervals. The tool of FIG. 5 is referred to by the reference numeral 10A and is somewhat different from the tool 10 in construction and operation. Many of the parts and components of the tool 10A are identical with those of the tool 10 and are given the same reference numerals.

The main differences in the tools reside in the means for supplying the triggering fluid to the top of the cylinder section 42 for initiation of a power stroke. Instead of a metering valve chamber, the tool 10A is provided with a needle valve chamber 140 which extends upwardly in the head section 18 from the handle 14. A lower portion of the needle valve chamber is internally threaded to receive a seat member 142 having an axial bore 142a and a conical needle valve seating surface 142b at the upper end thereof. The upper portion of the needle valve chamber above the seat 142b is in communication with the passage 24a through a passageway 144 formed in the head section 18.

The head section 18 is provided with a threaded bore 18a which is coaxial with the needle valve chamber 140 and extends upwardly therefrom to the top surface of the head section. The cap 22 is provided with a threaded bore 22b in alignment with the bore 18a and a needle valve member 146 is threadedly adjustable within these aligned bores to control the airflow into the needle valve chamber. The needle valve member 146 includes a knurled knob 146a at the upper end thereof for adjusting the needle valve within the bore and the lower end of the valve member is formed with a conically tapered point 146b for engagement against the seating surface 142a when the needle valve is closed.

When the needle valve member 146 is open, compressed fluid will flow from the handle 14 through the bore 142a into the needle valve chamber 140. The rate of flow into the chamber depends upon adjustment of the needle valve member and can be varied over a wide range. The compressed fluid in the needle valve chamber flows up the passageway 144, passage 24a, and ports 66a in the piston head 66, and when pressure of this fluid builds up to a level sufficient to overcome the spring 84 and the resultant upward force on the valve member from compressed air in the piston chamber 80, the piston valve head 72 is unseated and a power stroke is initiated.

Because the bore 142a is relatively small in diameter, it takes a certain time for enough compressed fluid from the handle 14 to bleed through the bore and passages and accumulate enough pressure to initiate a power stroke. This time interval is selectively controlled by adjusting the position of the needle valve member 146 with respect to the seat 142b. With a close adjustment, the time interval between successive power strokes is longer and, with a more open adjustment, the time interval is shortened. Once the proper setting of the needle valve member 146 is obtained, the tool 10A will continue to fire at the selected time intervals until the fluid supply is disconnected from the handle of the needle valve and is closed completely. The cap 22 of the tool 10A is not provided with an exhaust vent passage, such as the passage 22a in the tool 10 as this would render the automatic function of the tool inoperative.

Once the needle valve member 146 is set to fire the tool at the selected time interval, the tool will continue to fire automatically. This feature makes the tool 10A extremely useful in automated production lines and the like. After initiation of a power stroke, the tool 10A operates in a manner similar to the tool 10 and the piston assembly 38 is automatically returned to the top of the cylinder section 42.

Although the present invention has been described with reference to several illustrative embodiments thereof, it should be understood that numerous other modifications and embodiments can be devised by those skilled in the art that will fall within the spirit and scope of the principles of this invention.

What is claimed as new and desired to be secured by Letters Patent of the United States is:

1. A single stroke motor using pressurized fluid comprising a housing defining a reservoir for said pressurized fluid, a cylinder in said housing, piston means slidably mounted in said cylinder including a piston valve seat thereon, piston valve means movably mounted on the piston means and movable against said seat for normally closing communication between the reservoir and one end of the cylinder, and means in communication with said one end of said cylinder for supplying pressurized fluid thereto to unseat said piston valve means away from said seat to place the reservoir in communication with the cylinder thereby admitting pressurized fluid for driving the piston means.

2. The motor defined by claim 1 including an exhaust system passing through the piston means for exhausting pressurized fluid from the cylinder.

3. A single stroke motor using a pressurized fluid comprising a housing defining a reservoir for said pressurized fluid, a cylinder in said housing, piston means slidably mounted in said cylinder, said piston means having a head portion with a greater surface area on one side and a lesser surface area on the opposite side having a valve seat thereon, means normally supplying pressurized fluid from the reservoir to act on said lesser surface area to hold the piston means in a normal position, valve means carried on said piston means and normally closed against said seat in a position closing communication between said lesser and greater areas of said piston head, and means for supplying pressurized fluid to one end of said cylinder adjacent said greater surface area of said piston for unseating said valve means to place said lesser and greater areas in communication so that the pressurized fluid acting on said greater area drives said piston means.

4. The motor set forth in claim 3 in which said valve means is slidably mounted on the piston means and includes an actuating surface responsive to pressurized fluid when said valve means is opened for supplementing the force caused by pressurized fluid acting on said greater area surface of said piston head to drive said piston means.

5. The motor set forth in claim 4 in which said means for operating the valve means includes means for supplying pressurized fluid against said actuating surface to open said valve means.

6. A pneumatic motor comprising a sealed housing supplied with compressed fluid, cylinder means in said housing, piston means in said cylinder means including a piston chamber sealed between opposite ends thereof, port means in said cylinder means in continuous communication between said housing and said piston chamber, valve means remote from said piston means operable to open and close communication between said housing and one end of said cylinder means, and pressure responsive valve means on said piston means including a valve seat thereon operable to open and close communication through said one end of said piston means between said piston chamber and said one end of said cylinder means.

7. A pneumatic motor comprising a sealed housing supplied with compressed fluid, cylinder means in said housing including a large diameter power end and a smaller diameter opposite end vented to the atmosphere, piston means in said cylinder means including a large diameter head portion slidable in the power end of said cylinder means and a small diameter head portion at the opposite end slidable in the smaller diameter end of said cylinder means, said piston heads defining opposite ends of a piston chamber normally sealed between said large and small diameter end portions of said cylinder means, port means in said cylinder means in communication between said housing and said piston chamber, manual valve means operable to open and close communication between said housing and said power end of said cylinder means for introducing a metered quantity of pressurized fluid into said power end, and pressure responsive valve means on said piston means operably associated with a valve seat on said large diameter head portion responsive to pressurized fluid in said power end of said cylinder means to open communication through said piston means between said piston chamber and said power end of said cylinder means thereby permitting pressurized fluid from said piston chamber to flow directly into said power end and initiate a power stroke for driving said piston means toward the vented end of said cylinder means.

8. A pneumatic motor comprising a sealed housing supplied with compressed fluid, cylinder means in said housing, piston means in said cylinder means and including a piston chamber sealed between opposite ends thereof, port means in said cylinder means in communication between said housing and said piston chamber, valve means operable to open and close communication between said housing and one end of said cylinder means, and pressure responsive valve means on said piston means adjacent one of said ends of said piston means operable to open and close communication through passage means in said one end of said piston means between said piston chamber and said one end of said cylinder means, said pressure responsive valve means including a movable valve element having a surface in communication with said one end of said cylinder means through said passage means and an opposite surface vented through said piston means to the atmosphere.

9. A pneumatic motor comprising a sealed housing supplied with compressed fluid, cylinder means in said housing having a power end and an opposite end vented to the atmosphere, piston means in said cylinder means and including a piston chamber sealed between opposite ends thereof, port means in said cylinder means intermediate the ends thereof in communication between said housing and said piston chamber, valve means operable to open and close communication between said housing and the power end of said cylinder means, and pressure responsive valve means mounted on said piston means including a valve seat thereon and operable to open and close communication between said piston chamber and said power end of said cylinder means in response to the differential pressure between the power end and said opposite end of said cylinder means.

10. A pneumatic motor comprising a sealed housing supplied with compressed fluid, cylinder means in said housing including a large diameter power end and a smaller diameter opposite end vented to the atmosphere, piston means in said cylinder means including a first head portion slidable in the power end of said cylinder means and a second head portion slidable in the smaller diameter end of said cylinder means, said piston means including an intermediate piston chamber normally sealed between said first and second head diameter portions in communication with said cylinder means, port means in said cylinder means intermediate the ends thereof in continuous communication between said housing and said piston chamber, valve means operable to open and close communication between said housing and said power end of said cylinder means for introducing pressurized fluid into said power end, and pressure responsive valve means on said piston means including an annular seat on said first head portion operable in response to differential pressure between said smaller diameter end and said power end of said cylinder means to open communication between said piston chamber and said power end of said cylinder means through said first head portion, thereby permitting pressurized fluid from said piston chamber to flow into said power end and initiate a power stroke driving said piston means toward the vented end of said cylinder means.

11. A pneumatic motor comprising a sealed housing supplied with compressed air, cylinder means in said housing, piston means in said cylinder means and including a piston chamber sealed between opposite ends thereof, port means in said cylinder means in communication between said piston chamber and said housing, pressure responsive valve means mounted on said piston means including a valve seat thereon and operable to open and close communication between one end of said cylinder means and said piston chamber, a valve chamber in said housing having an outlet in communication with said one end of said cylinder means and an inlet in communication with said housing, and valve means normally closing said outlet of said valve chamber and operable to open said outlet and close said inlet.

12. A pneumatic motor comprising a sealed housing supplied with compressed air, cylinder means in said housing, piston means in said cylinder means and including a piston chamber sealed between opposite ends thereof, port means in said cylinder means in communication between said piston chamber and said housing, passage means in said piston means in communication between one end of said cylinder means and said piston chamber, pressure responsive valve means on said piston means including an annular seat thereon around said passage means and operable to open and close said passage means in response to differential pressure between opposite ends of said piston means, a valve chamber in said housing having an outlet in communication with said one end of said cylinder means and an inlet in communication with said housing, and valve means normally closing said outlet of said valve chamber and operable to open said outlet and close said inlet.

13. A pneumatic motor comprising a sealed housing supplied with compressed air, cylinder means in said housing having a power end and an opposite end in communication with the atmosphere, piston means in said cylinder means and including a piston chamber sealed between opposite ends thereof, port means in said cylinder means in communication between said piston chamber and said housing, first passage means in said piston means in communication between said piston chamber and said power end of said cylinder means, pressure responsive valve means in said piston means operable to open and close said first passage means, second passage means in said piston means in communication between said power and said opposite ends of said cylinder means, a valve chamber in said housing having an outlet in communication with said power end of said cylinder means and an inlet in communication with said housing, and valve means normally closing said outlet of said valve chamber and operable to open said outlet and close said inlet.

14. A pneumatic motor comprising a sealed housing supplied with pressurized air, cylinder means in said housing having one end in communication with the atmosphere and an opposite end, piston means in said cylinder means and including a piston chamber normally sealed between opposite ends of said cylinder means, port means in said cylinder means in continuous communication between said piston chamber and said housing, piston valve means slidably mounted on said piston means seatable against a valve seat on said piston means adjacent one end of said piston chamber, said piston valve means and including a wall defining one end of an expansible internal chamber in said piston in communication with said one end of said cylinder means, passage means in said piston means in communication with said piston chamber and said opposite end of said cylinder means, said wall of said piston valve means movable in response to pressure in said opposite end of said cylinder means to open and close said passage means, and valve means operable to open and close communication between said housing and said opposite end of said cylinder means.

15. A pneumatic motor comprising a sealed housing supplied with pressurized air, cylinder means in said housing having one end in communication with the atmosphere, piston means in said cylinder means and including a piston chamber sealed between opposite ends of said cylinder means, port means in said cylinder means in communication between said piston chamber and said housing, piston valve means slidably mounted on said piston means and including a wall defining one end of an expansible internal chamber in said piston, first passage means in said piston means in communication with said other end of said cylinder means and said piston chamber, second passage means in said piston means in communication between said ends of said cylinder means, one surface of said wall of said piston valve means being movable to open and close said first passage means and an opposite surface facing said internal chamber, and valve means operable to open and close communication between said housing and the other end of said cylinder means.

16. A pneumatic motor comprising a sealed housing supplied with compressed air, cylinder means in said housing, piston means in said cylinder means including a piston chamber between opposite ends thereof, port means in said cylinder means in communication between said piston chamber and said housing, pressure responsive valve means mounted on said piston means movable with respect to a valve seat thereon between opposite ends and operable to open and close communication between one end of said cylinder means and said piston chamber, passage means in communication between said one end of said cylinder means and said housing, and valve means in said passage means for selectively controlling the flow rate of fluid from said housing to said one end of cylinder means.

17. The pneumatic motor of claim 16 wherein said passage means includes a valve seat and said valve means includes a needle valve cooperating with said seat to selectively control the flow through said passage means.

18. A pneumatic motor comprising a housing for compressed fluid, a cylinder in said housing, and a piston assembly slidably mounted in said cylinder, said piston assembly including an annular piston chamber means sealed between opposite ends of said piston assembly and in communication with the interior of said cylinder, said cylinder including wall means defining port means therein for continuously supplying compressed fluid to said piston chamber means from said housing, control means for admitting pressurized fluid from said housing into one end of said cylinder to initiate a power stroke of said piston assembly, and valve means movably mounted on said piston assembly for movement in response to the fluid pressure in said one end of said cylinder, said valve means operable to open and close communication between said piston chamber means and said one end of said cylinder whereby compressed fluid within said chamber means is operable to drive said piston assembly on a power stroke, said piston assembly including shoulder means engageable with said valve means after initial movement thereof whereby said piston assembly and valve means move together on a power stroke after said valve means is moved to a fully open position, said piston assembly being movable from a first position on a power stroke to a second position and from said second position to said first position on a return stroke, said wall means including first port means and larger second port means spaced therefrom, said second port means being positioned in said wall means at a location whereby an end portion of said piston assembly is in covering relation therewith when said piston assembly is in said second position.

19. The apparatus of claim 18 wherein said first port means is in continuous open communication with said piston chamber means as said piston assembly moves on a power and return stroke.

20. The apparatus of claim 18 wherein said end portion of said piston assembly moves away from said first port means and uncovers said second port means on a return stroke from said second position.

21. A pneumatic motor comprising a housing supplied with compressed fluid, cylinder means in said housing, piston means in said cylinder means movable on a power stroke from one and thereof and on a return stroke toward said one end, said piston means defining a piston chamber in said cylinder means normally sealed between opposite ends and in communication with said housing, piston valve means mounted on said piston means including a valve seat and normally closing communication between said piston chamber and said one end of said cylinder means, and control valve means movable between an inoperative and an operative position for admitting pressurized fluid from said housing into said one end of said cylinder means to initiate a power stroke of said piston means, said control valve means including means for preventing a flow of fluid from said housing into said one end of said cylinder means on initial pressurization of said housing regardless of the position of said control valve means.

22. The apparatus as defined in claim 21 wherein said control valve means includes means for preventing the flow of pressurized fluid from said housing into said one end of said cylinder until said control valve means is first returned to said inoperative position before movement to an operative position for initiating a power stroke.

References Cited

UNITED STATES PATENTS

| | | | |
|---|---|---|---|
| 2,397,103 | 3/1946 | Haberstump | 91—38 |
| 3,051,135 | 8/1962 | Smith. | |
| 3,064,626 | 11/1962 | Kufel | 91—38 |
| 3,081,741 | 3/1963 | Goldring. | |
| 3,229,589 | 1/1966 | Langas | 91—422 |
| 3,259,292 | 7/1966 | Maynard | 227—130 |
| 3,278,103 | 10/1966 | Juilfs | 227—130 |
| 3,278,104 | 10/1966 | Becht | 227—130 |
| 3,301,456 | 1/1967 | Schafroth | 227—120 |
| 2,058,425 | 10/1936 | Doyle | 91—5 |
| 3,257,912 | 6/1966 | Horst | 91—417 |

FOREIGN PATENTS

| | | |
|---|---|---|
| 67,578 | 3/1958 | France. |

EDGAR W. GEOGHEGAN, *Primary Examiner.*

B. L. ADAMS, *Assistant Examiner.*